Patented Oct. 10, 1944

2,360,195

UNITED STATES PATENT OFFICE 2,360,195

WATER CONDITIONING PRODUCT AND PROCESS

Wesley E. Brittin, Boulder, Colo., assignor to The Permutit Company, New York, N. Y., a corporation of Delaware No Drawing. Application April 22, 1941, Serial No. 389,773

16 Claims. (Cl. 210—24)

This invention relates to an anion absorbing or exchanging product, the preparation thereof and a regenerative process of removing acid from liquids by means of said product. More particularly, the invention concerns a product capable of removing acid from a liquid without imparting objectionable constituents thereto, and capable of repeated use after regeneration with a basic solution.

Various materials have been proposed heretofore for removing acid from liquids by a reaction which involves either an absorption of the acids carried by the liquids or by an exchange of hydroxyl ion for the anion of the acid in the liquid. In either case, the result is the removal of acid from the liquid.

Products having this property of removing acids are generally known as anion exchangers, and will be so referred to herein, although it is possible that the mechanism of the reaction of removing acid may involve either simple anion exchange or the actual removal and absorption of the acid molecules.

For most purposes, it is desirable to provide a solid anion exchanger that can be used repeatedly to remove acid from a liquid such as water, with regeneration of the exchanger after its acid removing properties have become depleted. Such anion exchangers have a wide range of application in industry and are particularly useful in conjunction with hydrogen exchanging zeolitic materials. For example, if a solution of a salt is passed in contact with a hydrogen zeolite, the cation of the salt is taken out of the solution by the zeolite in exchange for hydrogen, thus leaving a solution of the acid of the original salt. Such a residue is frequently objectionable except when the original salt happens to be a bicarbonate or carbonate.

Most waters requiring conditioning, however, contain at least some sulfate or chloride, or both, in which case the hydrogen zeolite treated water contains sulfuric acid, hydrochloric acid, or both. An anion exchanger may be used to treat such an effluent from a hydrogen zeolite process to remove this residual acid from the water. In this manner it is possible, in the case of very dilute solutions of salts, to produce a substantially pure water free from solids by this two-step treatment.

In order for such a process to be economical and practical, however, the anion exchange material should be a product that is insoluble in water, of good physical character to withstand repeated use and capable of remaining at a high efficiency after repeated use of the product followed by a regeneration in each case with a solution of a base. Such a product also should be sufficiently insoluble in dilute acids or dilute alkalies, to perform the required function of removing acid from liquids without imparting objectionable constituents to the liquid being treated, and without being decomposed by the alkaline regenerating solution.

One object of this invention is the production of a material eminently suited for the removal of acid from various liquids that also has good physical properties and is capable of repeated regenerations with a basic solution.

Another object is to provide an effective and efficient method of preparing an animated water insoluble product capable of use as an anion exchanger.

A further object of the invention is to provide a regenerative method of removing acid from liquids by contacting the liquid with such a product, and thereafter regenerating the product with a solution of a base.

Other objects will be explained and will be apparent from the following description of the invention.

I have discovered that solid water insoluble animated products capable of being used in a regenerative process for removing acid from liquids can be prepared by first nitrating a solid humic material resulting from the decomposition of vegetable matter, and reducing the nitrated material. Various solid natural decomposition products can be used as a raw material for this process, including not only the various coals, such as anthracite, bituminous, semi-bituminous or cannel coal and brown coal or lignite, but also such humic materials as natural humus and peat. All of these materials belong to the same family of materials derived from the natural decomposition of vegetable matter although they vary considerably from each other in physical properties and in chemical composition.

For most purposes, it is desirable in a regenerative process to use an anion exchanger in the form of granules so that the liquid to be treated and the regenerating agent can be passed through a bed of the granules. For this purpose, it is desirable to have not only a granular product that does not impart objectionable constituents to the liquid being treated, but the granules should also have a sufficient hardness to resist abrasion and physical disintegration that might be caused by agitation of the granular bed during the different steps of the process. One of the coals is therefore preferred as a raw material in the preparation of the anion exchangers of this invention because of their relatively hard granular nature.

Various nitrating reagents may be employed, including, of course, concentrated nitric acid, fuming nitric acid or various mixtures of nitric acid with water. In addition, nitric acid may be used when mixed with various materials such as sulfuric acid, oleum, acetic acid, acetic anhydride, phosphoric acid or other materials that do not interfere with the nitrating reaction. Also gaseous nitrating reagents such as suitable oxides of nitrogen may be employed.

This nitrating reaction increases the nitrogen content of the organic material treated and probably introduces nitro groups into many of the different organic compounds making up the raw carbonaceous material. Because of the complicated nature of the humic material, it is extremely difficult, if not impossible, to determine the exact reactions taking place.

The nitrating reaction may be carried out under various conditions, although it is preferable to avoid excessive oxidation. The best results for purposes of this invention, therefore, are obtained if the temperature is maintained below about 100° C., and the reaction is allowed to continue for a few hours. A suitable slow rate of nitration is obtained when the temperature is held within the range of 0 to 50° C., and while the nitrating reaction may be completed in from about thirty minutes to twenty-four hours, it is preferable to complete the reaction within about one to five hours. With the foregoing nitrating agents under these conditions, no catalysts are required. In fact, it is desirable to avoid the use of catalysts that increase the oxidation of the organic humic material although some oxidation probably cannot be avoided.

It is usually desirable to employ a relatively large proportion of nitrating reagent, and I prefer to employ liquid nitrating reagents. The organic material to be treated receives a more uniform nitration if it is treated in a finely divided form, and it is best to mix it with the nitrating reagent slowly with agitation to avoid sharp temperature rises and excessive oxidation. After the ingredients are mixed, they may be allowed to react for several minutes or several hours. At the end of this period of reaction, the solid nitrated material is separated by either decanting off the liquid or by filtration, and the nitrated product is then washed to remove excess acid.

In order to reduce this nitrated product, any of the common methods that are known for reducing nitro compounds to amino compounds may be employed. For example, a solution of stannous chloride in hydrochloric acid is satisfactory, or alkaline sulfide solutions, various metals and acids producing nascent hydrogen, alkaline ferrous sulfate, sodium hydrosulfite or various other reducing agents may be used. One good method of effecting reduction of the nitrated product is to employ a catalytic hydrogenation by subjecting the nitrated product while suspended in an organic solvent such as dioxane, methanol or ethanol to hydrogen under pressure in the presence of a platinum or nickel catalyst. Such a hydrogenation may be carried out at various pressures, such as 1 to 1000 atmospheres, and various temperatures such as 50 to 150° C.

After the reduction of the product, the final aminated organic material may be washed free of reducing agent, if necessary, and subjected to a simple treatment with a basic solution. It is then ready for removing acid from liquids and after it has been so used may be regenerated repeatedly simply by further treatments with basic solutions.

In order that the invention may be more fully understood, the following examples of the preparation of aminated anion exchange products according to this invention are given, although it is to be understood that my invention is not limited thereto.

The products obtained according to these examples were tested to determine their ability to remove acid from liquids. In each of these tests, the product was regenerated with an excess of 14% ammonium hydroxide solution for at least one hour, and washed with distilled water until the washings gave only a faint pink color with phenolphthalein. The washed product was air dried and a weighed sample thereof placed in a flask with a measured volume of hydrochloric acid of known strength. After shaking for five hours, an aliquot of the supernatant liquid was neutralized and titrated with a standard solution of silver nitrate to determine the extent of chloride removal. These results were then calculated in terms of the sample on an oven dried basis, after determining the mixture content of a sample of the product.

It has been found that such a test gives an accurate indication of the actual acid absorption or anion exchange of the products, and does not include any neutralization of acid that may take place because of regenerant adhering to or absorbed by the exchange product.

It has also been found that a given anion exchange product usually has a different acid removal capacity with different strengths of acids. Certain of the data given in the examples, therefore, refers to the capacities of the products in terms of chloride removal with more than one strength of acid.

*Example I.*—10 kilograms of granulated bituminous coal containing 1.35% nitrogen and ranging in size from 20 to 50 mesh was suspended in 40 liters of glacial acetic acid. Over a period of 30 minutes, 45 liters of nitric acid (sp. gr. 1.42) was added while the suspension of coal was being constantly stirred. The temperature of the reacting ingredients rose during this time from 26° to 35° C. After leaving the coal in this nitric-acetic acid mixture for about 15 hours, the liquid was decanted off and the solid residue washed with water until free from nitric acid. The washed nitrated coal was then placed in a solution of 50 kilograms of stannous chloride (SnCl$_2$ 2H$_2$O) dissolved in 80 liters of concentrated hydrochloric acid maintained at about 75° C. and stirred for three hours. After this reducing treatment, the coal was washed with 18% hydrochloric and then with water. After converting the nitrated and reduced coal to its acid absorbing condition with 14% ammonium hydroxide, the product was again washed with water and found to contain 4.89% nitrogen. This product, when subjected to the foregoing shaking test with 0.16N hydrochloric acid, was found to remove 0.85 milliequivalents of chloride ions per gram of product.

*Example II.*—Two separate 10 kilogram portions of 20 to 50 mesh bituminous coal were added to two separate 50 liter portions of nitric acid (sp. gr. 1.42). In each case, the temperature rose for about 15 minutes until it reached about 47° C. after which it began to drop. One of the 10 kilogram portions of coal was washed free of acid after one hour while the other portion was allowed to remain in the nitric acid for four hours before washing. Both portions of washed nitrated coal were then reduced with stannous chloride and regenerated with ammonium hydroxide as described above under Example I. The product nitrated for one hour contained 5.17% nitrogen and the product nitrated for four hours contained 5.82% nitrogen. A corresponding difference in the ability of the products to remove acid from liquid was found. For example, the one hour product was found to remove 0.47 milliequivalent of chloride ions per gram, while the four hour product removed 0.52 milliequivalents of chloride ions per gram when given the shaking test with 0.167N hydrochloric acid.

*Example III.*—10 kilograms of 20–50 mesh bituminous coal were added in small portions with stirring to 50 liters of fuming nitric acid (sp. gr. 1.6) maintained at 7–10° C. The coal was added over a period of 30 minutes and allowed to remain in the acid for a total time of 4 hours. The nitrated coal was then washed, reduced with stannous chloride and regenerated with ammonium hydroxide as described above in Example I. This product was found to contain 6.26% nitrogen after the final washing, and when the product was shaken with 0.167N hydrochloric acid, it removed 0.58 milliequivalents of chloride ions per gram.

*Example IV.*—25 kilograms of 20–50 mesh bituminous coal were added in small portions to 50 liters of nitric acid (sp. gr. 1.42) with constant stirring and while maintaining the acid and coal at about 5–9° C. The addition was completed in about 15 minutes and 20 liters of concentrated sulfuric acid were then added slowly to the mixture over a period of about 30 minutes. During this latter addition, the stirring was continued and the mass was cooled to maintain approximately the same low temperature. After allowing the coal to remain in this acid mixture for 15 hours, the nitrated solid material was washed, reduced with stannous chloride, and regenerated with ammonium hydroxide as described above in Example I. The product after the final washing contained 6.20% nitrogen. Each gram of this product removed 0.69 milliequivalents of chloride ions, in the shaking test when the final chloride ion concentration was 38 milliequivalents per liter.

*Example V.*—15 kilograms of nitrated and washed coal prepared according to Example IV were mixed and heated with 82.7 kilograms of sodium sulfide ($Na_2S.9H_2O$) dissolved in 80 liters of 14% ammonium hydroxide. After this reducing treatment, the solid product was washed, regenerated and tested for its acid removal ability. Each gram of the product removed 0.26 milliequivalent of chloride ions, and 0.04 milliequivalent of chloride when the final chloride ion concentrations were 46.5 and 10 milliequivalents per liter, respectively.

*Example VI.*—15 kilograms of 10 to 40 mesh lignite was added slowly with stirring to 75 liters of nitric acid (sp. gr. 1.42) maintained at a temperature below 12° C. After nitration for one hour, the product was washed and reduced with 100 kilograms of stannous chloride dihydrate in 150 liters of concentrated hydrochloric acid. The reduced product was then washed, regenerated with ammonium hydroxide and again washed as described in Example I. This product removed 0.25 milliequivalent of chloride ion per gram when the final chloride ion concentration was 46 milliequivalents per liter.

In the use of the nitrated and reduced organic anion exchange products of this invention for removing acid from liquids, it is usually convenient to form a bed of granules of the product in a suitable container and flow the liquid to be treated through this bed. When the acid removing properties of the granules have been exhausted, or after a suitable period of use, the flow of liquid is stopped and the bed is regenerated with a solution of a base and washed. The bed is then in condition for resuming flow of the liquid to be treated.

Many different bases may be used for regenerating the exchange product as will be understood by those skilled in the art, and although the invention is not limited thereto, mild aqueous solutions of ammonium hydroxide, the alkali metal hydroxides, carbonates or bicarbonates are satisfactory for this purpose.

The size of the granules used to form a bed may vary considerably, although generally particles passing through a 50 mesh screen are so small that they are apt to be washed out of the container during regeneration or backwashing. In order to have as large an exposed surface of active exchange material as possible, the major portion of the granules should be small enough to pass through a 10 mesh screen.

The exchange product, however, may be used in other ways than as a granular bed. For example, the anion exchange product may be added in a granular or powdered form to a batch of liquid containing acid to be removed, and then separated from the liquid by settling or filtration. In this case, the separated solid exchange product may be regenerated with a basic solution, washed with water, and added to another batch of liquid to be treated.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A method of preparing a water-insoluble anion exchange product comprising reacting humic material derived from the natural decomposition of vegetable matter with nitric acid at a temperature below about 100° C. to nitrate said material, and reacting said nitrated material with a reducing agent.

2. A method of preparing a water-insoluble organic product for removing acids from liquids comprising treating a coal at a temperature below about 100° C. with a nitrating reagent that reacts to increase the nitrogen content thereof, and reducing said nitrated coal.

3. A method of preparing a water-insoluble organic product for removing acids from liquids comprising treating finely divided humic material derived from the natural decomposition of vegetable matter with a nitrating reagent at a temperature below about 100° C. to increase the nitrogen content of said humic material, and thereafter treating said nitrated humic material with a reducing agent to form amino groups.

4. A method of preparing a water-insoluble organic product for removing acids from liquids comprising treating finely divided humic material derived from the natural decomposition of vegetable matter with a reagent that nitrates said material at a temperature below about 100° C., treating said nitrated material with a reducing agent that reduces nitro groups, and thereafter reacting the reduced product with an alkaline solution.

5. A method of preparing a water-insoluble organic product for removing acids from liquids comprising treating a finely divided bituminous coal at a temperature below about 100° C. with a nitrating reagent including nitric acid to increase the nitrogen content of said coal, and thereafter reducing said nitrated coal.

6. A method of preparing a water-insoluble organic product for removing acids from liquids comprising treating a finely divided bituminous coal at a temperature below about 100° C. with a nitrating reagent including nitric acid to increase the nitrogen content of said coal, thereafter reducing said nitrated coal and, reacting the reduced product with an alkaline solution.

7. A regenerative process of removing acid from a liquid comprising bringing the liquid into contact with a water-insoluble product prepared by nitrating a coal at a temperature below about 100° C. and then reducing the nitrated coal, and regenerating the product after contact with said liquid by a treatment with an alkaline solution.

8. A regenerative process of removing acid from a liquid comprising bringing the liquid into contact with a water-insoluble product prepared by reacting solid humic material resulting from the natural decomposition of vegetable matter at a temperature below about 100° C. with a liquid nitrating reagent containing nitric acid to add nitrogen and reacting said nitrated material with a reducing agent that reduces nitro compounds to amino compounds, and regenerating said product with an alkaline solution after said contact with the liquid.

9. A regenerative process of removing acid from a liquid comprising bringing the liquid into contact with a water-insoluble product prepared by nitrating at a temperature below about 100° C. a humic material resulting from the natural decomposition of vegetable matter and reducing said nitrated material, and regenerating the product after contact with said liquid by a treatment with an alkaline solution.

10. A cyclic process of removing acid from water comprising flowing said water containing acid in contact with a granular product prepared by nitrating bituminous coal at a temperature below about 100° C. and reducing the nitrated coal with a reagent that reduces nitro compounds to amino compounds, stopping the flow of water after the acid removing capacity of said product has become depleted, regenerating the product with an alkaline solution, and again flowing water containing acid in contact with the regenerated product.

11. As a new composition of matter, a water-insoluble product for removing acid from liquids and capable of being regenerated with a solution of a base, said product comprising solid humic material resulting from the natural decomposition of vegetable matter that has been nitrated and then reduced.

12. As a new composition of matter, a water-insoluble product for removing acid from liquids and capable of being regenerated with a solution of a base, said product comprising coal that has been nitrated and then reduced.

13. An anion exchange product capable of use in a regenerative process for removing acid from water and prepared by treating solid humic material resulting from the natural decomposition of vegetable matter at a temperature below about 100° C. with a nitrating reagent including nitric acid, and reacting the nitrated material with a reducing agent that reduces nitro compounds to amino compounds.

14. An anion exchange product capable of use in a regenerative process for removing acid from water and prepared by treating solid humic material resulting from the natural decomposition of vegetable matter with a nitrating reagent including nitric acid at a temperature below about 100° C. to avoid excessive oxidation, and reacting the nitrated material with a reducing agent that reduces nitro compounds to amino compounds.

15. An anion exchange product capable of use in a regenerative process for removing acid from water and prepared by treating granular coal at a temperature below about 100° C. with a nitrating reagent, and reacting the nitrated coal with a reducing agent that reduces nitro compounds to amino compounds.

16. An anion exchange product capable of use in a regenerative process for removing acid from water and prepared by reacting finely divided bituminous coal with a nitrating reagent including nitric acid at a temperature below about 100° C. to avoid excessive oxidation, and thereafter reacting said nitrated coal with a reducing agent that reduces nitro compounds to amino compounds.

WESLEY E. BRITTIN.